(12) United States Patent
Armstrong et al.

(10) Patent No.: US 7,442,239 B2
(45) Date of Patent: Oct. 28, 2008

(54) FUEL-CONDITIONING SKID

(75) Inventors: Jeffrey A. Armstrong, Exeter, NH (US); Shaun Sullivan, Northwood, NH (US); Eric Roslund, Huntersville, NC (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 599 days.

(21) Appl. No.: 10/807,761

(22) Filed: Mar. 24, 2004

(65) Prior Publication Data

US 2004/0188360 A1    Sep. 30, 2004

Related U.S. Application Data

(60) Provisional application No. 60/457,072, filed on Mar. 24, 2003.

(51) Int. Cl.
   *B01D 19/00*    (2006.01)
(52) U.S. Cl. ............... 96/155; 55/315.1; 55/315.2; 55/385.1; 96/218; 96/219; 210/182
(58) Field of Classification Search ............... 55/315, 55/315.1, 315.2, 318, 385.1; 96/134, 135, 96/155, 218, 219, 380; 62/323.1; 210/182, 210/195.1, 241, 257.1, 259; 417/244, 248, 417/313; 60/785, 279; 95/143, 273; 123/541
   See application file for complete search history.

(56) References Cited

U.S. PATENT DOCUMENTS

| | | | | |
|---|---|---|---|---|
| 3,397,682 A | * | 8/1968 | Riggan | 60/279 |
| 3,748,830 A | * | 7/1973 | Ross et al. | 95/195 |
| 4,450,900 A | * | 5/1984 | Nathan | 96/26 |
| 4,638,852 A | | 1/1987 | Basseen et al. | |
| 4,761,968 A | | 8/1988 | Basseen et al. | |
| 5,031,690 A | * | 7/1991 | Anderson et al. | 165/43 |
| 5,107,919 A | | 4/1992 | Basseen et al. | |
| 5,722,229 A | * | 3/1998 | Provost | 60/785 |
| 6,019,817 A | * | 2/2000 | Seagle | 95/143 |
| 6,360,730 B1 | * | 3/2002 | Koethe | 123/541 |
| 6,893,487 B2 | * | 5/2005 | Alger et al. | 95/273 |
| 2004/0045440 A1 | | 3/2004 | Baseen et al. | |

FOREIGN PATENT DOCUMENTS

| | | |
|---|---|---|
| DE | 24 05 741 | 8/1975 |
| EP | 0 694 472 | 1/1996 |
| WO | WO 03/012271 | 2/2003 |
| WO | WO 03/029628 | 4/2003 |

* cited by examiner

*Primary Examiner*—Joseph W Drodge
(74) *Attorney, Agent, or Firm*—Michael Best & Friedrich LLP

(57) ABSTRACT

A fuel-conditioning skid for an engine. The fuel-conditioning skid includes an inlet that is connectable to a source to receive a flow of fuel containing undesirable compounds. An outlet is connectable to the engine to deliver a flow of fuel that is substantially free of undesirable compounds. An inlet cleaner is in fluid communication with the inlet and is operable to remove a portion of the undesirable compounds. A compressor is in fluid communication with the inlet cleaner to receive the flow of fuel at a first pressure and discharge the flow of fuel at a second pressure. The second pressure is greater than the first pressure. A purifier is in fluid communication with the inlet cleaner to receive the flow of fuel. The purifier is operable to remove substantially all of the remaining undesirable compounds from the flow of fuel.

13 Claims, 6 Drawing Sheets

FUEL-CONDITIONING SKID

RELATED APPLICATION DATA

This application claims benefit under 35 U.S.C. Section 119(e) of U.S. Provisional Patent Application Ser. No. 60/457,072, filed Mar. 24, 2003.

BACKGROUND OF THE INVENTION

Hydrocarbon-based fuels are available from a variety of sources including biogas from landfills, wastewater treatment plants, agricultural and other digesters, light hydrocarbon gases from oil and gas wells, and various heavier hydrocarbon gases from processes such as refinery processing. These fuels can be used in an engine to generate electricity and heat. These fuels can be combusted either in a gas turbine engine (Brayton cycle), an internal combustion engine (Otto cycle), or other prime-mover engines (e.g., Sterling engines). Any of these engines can be connected to an electric generator to generate electricity or a shaft to provide shaft power for a variety of applications. The electric generator would produce electricity, which could either be exported to the electric utility grid (grid-parallel) or used locally to power various on-site electric loads (grid independent). Waste heat from the combustion process can also be used to heat water or other fluids.

The fuels from the above-mentioned sources contain constituents and contaminants that can cause problems in the fuel system, and/or the engine. In addition, most engine combustion systems react fuel and air at elevated pressures. Thus, the fuel gas must be compressed to a higher pressure to be admitted into the engine for combustion.

SUMMARY

The present invention generally provides a fuel-conditioning skid for an engine. The fuel-conditioning skid includes an inlet that is connectable to a source to receive a flow of fuel containing undesirable compounds. An outlet is connectable to the engine to deliver a flow of fuel that is substantially free of undesirable compounds. An inlet cleaner is in fluid communication with the inlet and is operable to remove a portion of the undesirable compounds. A compressor is in fluid communication with the inlet cleaner to receive the flow of fuel at a first pressure and discharge the flow of fuel at a second pressure. The second pressure is greater than the first pressure. A purifier is in fluid communication with the inlet cleaner (either upstream or downstream of the compressor). The purifier is operable to remove substantially all of the remaining undesirable compounds from the flow of fuel.

In another aspect, the invention generally provides a combustion turbine engine comprising a generator operable to produce an electrical output and an air compressor operable to produce a flow of high-pressure air. A combustor receives a flow of fuel and the flow of high-pressure air and combusts the flow of fuel and the flow of high-pressure air to produce a flow of products of combustion. A turbine operates in response to the flow of products of combustion to drive the air compressor and the generator. A fuel-conditioning skid receives a flow of fuel that includes undesirable compounds and delivers the flow of fuel to the combustor. The fuel-conditioning skid includes a compressor that receives the flow of fuel at a first pressure and discharges the flow of fuel at a second pressure, the second pressure being greater than the first pressure. The fuel-conditioning skid also includes a plurality of cooling stages. The flow of fuel enters each stage at an inlet temperature and exits at an outlet temperature that is less than the inlet temperature. A final cooling stage discharges the flow of fuel to the combustor. A plurality of condensate drains, each associated with a cooling stage, operate to drain at least a portion of the undesirable compounds from the flow of fuel. The flow of fuel is substantially free of undesirable compounds at the combustor.

In still another aspect, the invention generally provides a method of conditioning a flow of fuel to make the flow of fuel suitable for combustion within an engine. The method includes delivering the flow of fuel to a fuel-conditioning skid, the flow of fuel including undesirable compounds. The method also includes filtering the flow of fuel to remove at least a portion of the undesirable compounds from the flow of fuel and compressing the flow of fuel. The method further includes cooling the flow of fuel in a plurality of cooling stages to condense at least a portion of the undesirable compounds and draining the condensed undesirable compounds from the flow of fuel during each of the plurality of cooling stages. The fuel flow is then reheated to raise the fuel temperature above its dew point to minimize the possibility of condensing liquids between the fuel conditioning skid and the engine. The method also includes directing the flow of fuel to the engine.

BRIEF DESCRIPTION OF THE DRAWINGS

The description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MW may utilize one or more microturbine engines.

Figure 1:
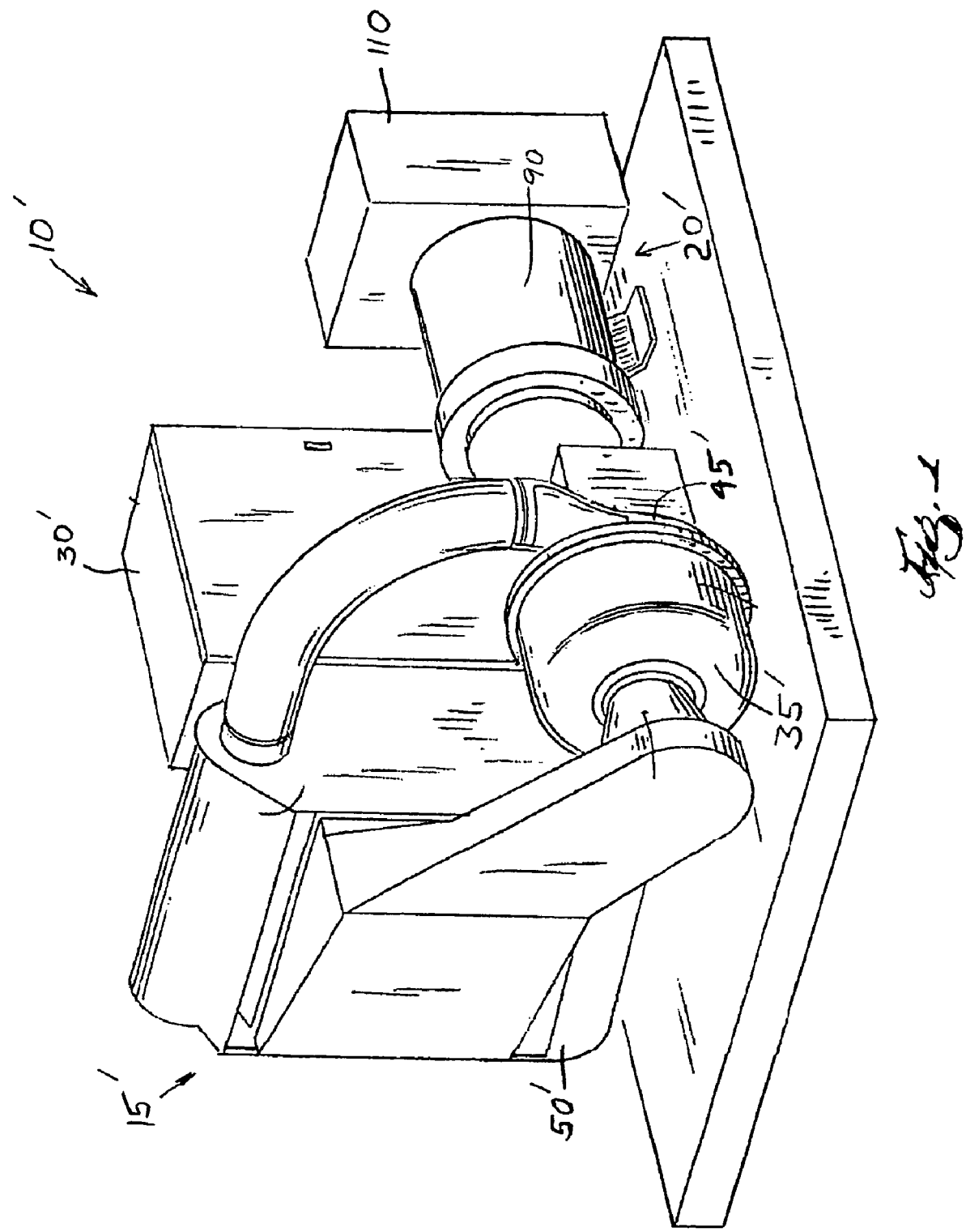
FIG. 1 is a perspective view of an exemplary microturbine engine system.
Figure 2:
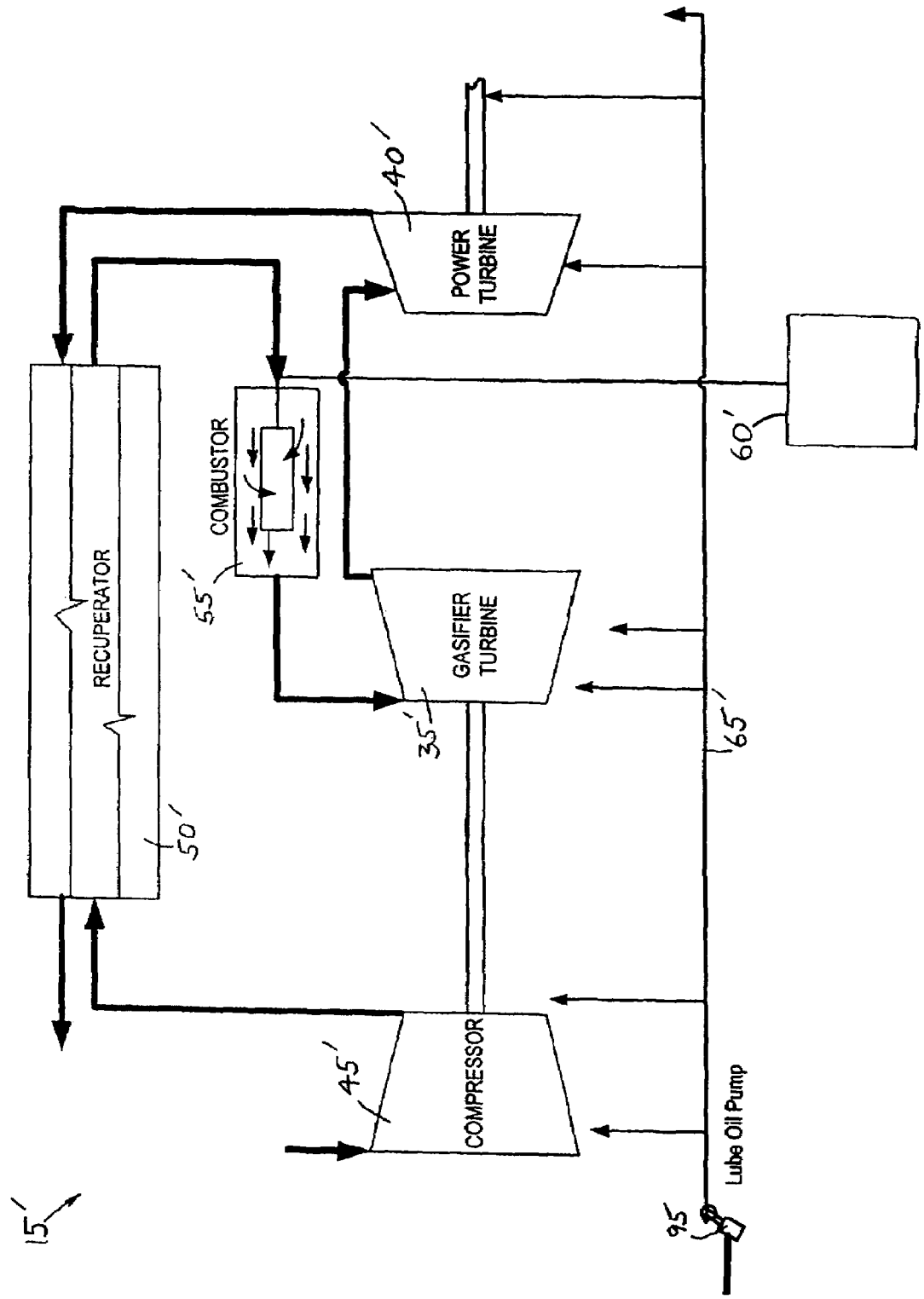
FIG. 2 is a schematic representation of the turbine section of FIG. 1.

With reference to FIGS. 1 and 2, the microturbine engine system 10' includes a turbine section 15', a generator section 20', switch gear (not shown), and a control system 30'.

The turbine section 15', schematically illustrated in FIG. 2, includes a gasifier turbine 35', a power turbine 40', a compressor 45', a recuperator 50', and a combustor 55'. The turbine section 15' also includes various auxiliary systems such as a fuel supply system or fuel skid 60' and a lubrication system 65'.

The turbine section 15' is a standard Brayton cycle combustion turbine cycle with a recuperator 50' added to improve engine efficiency. The engine shown is a multi-spool engine (more than one set of rotating elements). However, single spool engines are also contemplated by the invention. The compressor 45' is a centrifugal-type compressor having a rotary element that rotates in response to operation of the gasifier turbine 35'. The compressor 45' shown is generally a single-stage compressor, however, multi-stage compressors can be employed where a higher pressure ratio is desired. Alternatively, compressors of different designs (e.g., axial-flow compressors, reciprocating compressors, scroll compressor) can be employed to supply air to the engine.

The gasifier turbine 35' is a radial inflow single-stage turbine having a rotary element directly or indirectly coupled to the rotary element of the compressor 45'. In other constructions, multi-stage turbines or axial flow turbines are employed as gasifier turbines 35'. The rotary element of the power turbine 40' extends out of the turbine section 15' and engages the generator section 20', a gearbox (not shown), or other speed reducer disposed between the turbine section 15' and the generator section 20'.

The recuperator 50' includes a heat exchanger employed to transfer heat from a hot fluid to the relatively cool compressed air leaving the compressor 45'. A recuperator 50' consistent with the turbine section 15' of FIG. 1 is described in U.S. Pat. No. 5,983,992 herein fully incorporated by reference. The recuperator 50' includes a plurality of heat exchange cells stacked on top of one another to define flow paths therebetween. The cool compressed air flows within the individual cells, while a flow of hot exhaust gas passes between the heat exchange cells.

During operation of the microturbine engine system 10', the rotary element of the compressor 45' rotates in response to rotation of the rotary element of the gasifier turbine 35'. The compressor 45' draws in atmospheric air and increases its pressure. The high-pressure air exits the air compressor 45' and flows to the recuperator 50'.

The flow of compressed air, now preheated within the recuperator 50', flows to the combustor as a flow of preheated air. The preheated air mixes with a supply of fuel within the combustor 55' and is combusted to produce a flow of products of combustion. The use of a recuperator 50' to preheat the air allows for the use of less fuel to reach the desired temperature within the flow of products of combustion, thereby improving engine efficiency.

The flow of products of combustion enters the gasifier turbine 35' and transfers thermal and kinetic energy to the turbine. The energy transfer results in rotation of the rotary element of the turbine and a drop in the temperature of the products of combustion. The products of combustion exit the gasifier turbine 35' as a first exhaust gas flow.

The power turbine 40' receives the first exhaust flow and discharges a second exhaust flow. The rotary element of the power turbine 40' rotates in response to the flow of exhaust gas therethrough. The rotary element of the power turbine 40' is preferably connected through a gearbox to the rotary element of the device to be driven, in the case of FIG. 1, the generator section 20'. The power turbine 40' of FIG. 1 drives the generator section 20' at a fixed speed to produce the desired electrical output (e.g., 3600 or 1800 RPM for a 60 Hz system, 3000 or 1500 RPM for a 50 Hz system). In other constructions, a permanent magnet, or other non-synchronous generator may be used in place of the described synchronous generator.

The second exhaust flow enters the flow areas between the heat exchange cells of the recuperator 50' and transfers excess heat energy to the flow of compressed air. The exhaust gas then exits the recuperator 50' and is discharged to the atmosphere, processed, or further used as desired (e.g., cogeneration or heat recovery).

Radial inflow turbines of the type discussed herein operate most efficiently at very high speeds relative to the equipment they potentially drive (e.g., generators, screw-pumps, gear-pumps, etc.). For example, a gasifier turbine 35' may operate at 50,000 RPM or higher, while a synchronous generator operates at no more than 3600 RPM (to produce a 60 Hz output) and screw-pumps generally operate at about 15,000 RPM. These large speed differentials make multi-spool turbine systems desirable. The gasifier turbine 35' is able to operate at a very efficient speed, while the power turbine 40' operates at the speed needed by the equipment it is driving or at a speed necessary to drive a speed-reducing device.

In another construction, a single radial turbine rotates to drive both the compressor and the electrical generator 20' simultaneously. This arrangement has the advantage of reducing the number of turbine wheels.

A plurality of bearings support the rotary elements of the turbines 35', 40', the compressor 45', and the generator 90 for rotation. The lubrication system includes a lube oil pump 95 that provides a flow of lubricating oil to the bearings to reduce friction and wear, and to cool the bearings. While oil is generally used as the lubricating fluid, other fluids may be used to lubricate and cool the engine components.

While the constructions described in connection with FIGS. 1-2 include a microturbine engine, the system 10' is not limited to a microturbine engine for some aspects of the invention. Other prime movers (e.g., Otto cycle engines, Sterling engines, etc.) can be used in place of the turbine section 15' with some of the elements or components described herein.

Many engines combust natural gas to produce electricity. Natural gas is readily available in a clean high-pressure state (pipeline quality), which is easily deliverable to the combustion systems of these engines. In addition to natural gas, other fuels, such as biogas from landfills, are available and combustible by engines such as microturbine engines to produce electricity. However, before these fuel sources can be used, the fuel is generally "conditioned" (i.e., filtered, dried, cleaned of certain contaminants, and compressed). Fuels that are not conditioned sufficiently (e.g., inadequate filtering, drying, or removal of contaminates) can cause short-term and long-term damage to the microturbine fuel system, combustor, and downstream flow path components (e.g., turbine, recuperator, housings, ducts, and the like).

Conditioning involves several basic processes including but not limited to superheating the fuel to provide dewpoint suppression and removing unwanted elements or undesirable compounds in the fuel stream (e.g., solid particulates, water, heavier hydrocarbons that can condense in fuel lines, hydrogen sulfide and other halogenated compounds, siloxanes, and the like).

Figure 3:
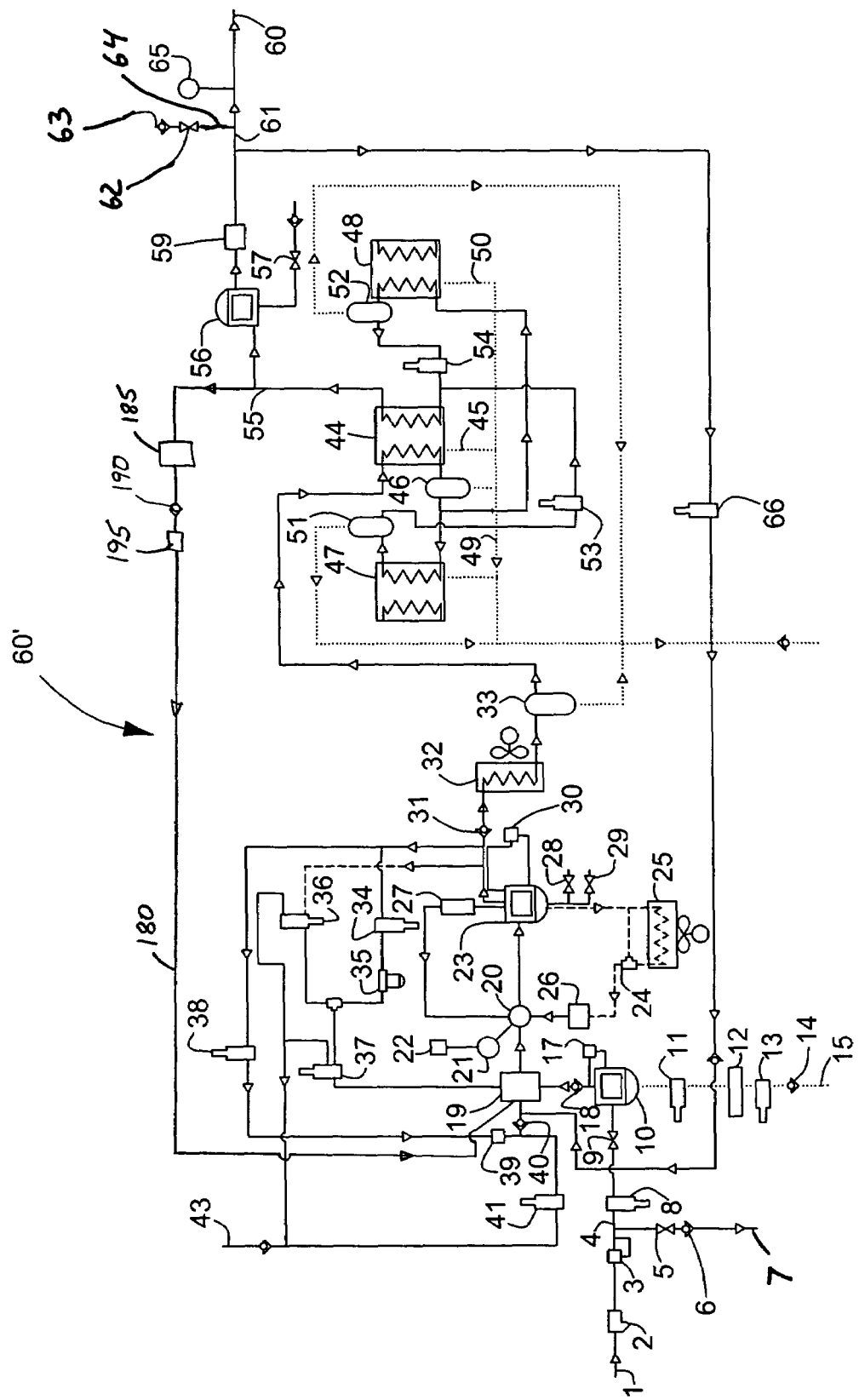
FIG. 3 is a schematic diagram of a fuel-conditioning skid with deep-chilling technology.

A fuel-conditioning skid 60', illustrated schematically in FIG. 3, conditions the fuel as described above and increases the delivery pressure of the fuel to a level suited to the particular engine to which the fuel skid is supplying fuel. The fuel-conditioning skid may be individually packaged as its own platform or skid, or it may be combined with one or more microturbines on a common platform. Combining the fuel-conditioning equipment with the microturbines provides a total system that will process and burn gases other than, and in addition to, pipeline quality natural gas to produce electric (or shaft) power and cogenerative heat.

The fuel-conditioning skid (FCS) 60', in which various components are packaged together onto a single, movable platform, is used to condition various types of fuels for subsequent supply to small turbine engines, internal combustion engines, and/or other prime movers. These engines can be used to drive generators and produce electricity and/or heat.

A schematic of the fuel conditioning apparatus of the FCS 60' is given in FIG. 3. A source of gaseous fuel (landfill, anaerobic digester, wellhead, refinery process, etc.) is supplied to the fuel-conditioning skid 60' at a skid inlet 1. The fuel can be either low pressure (below atmospheric pressure) or high pressure, in which case a pressure regulator 3 could be placed downstream of a strainer 2 to reduce the supply gas pressure. The fuel flows through the inlet strainer 2 to remove large particulates, including rust, weld slag, filings, and other debris. A purge assembly, consisting of a tee 4, a manual valve 5, and a check valve 6 can be used to initially purge the line to remove entrapped gas (air) and vent it to an outlet 7. This purge outlet 7 can also be used to adjust the FCS inlet pressure regulator 3 on skids 60' that include the regulator 3. A pressure gauge may be attached to the FCS 60' downstream of the pressure regulator 3 to indicate the gas pressure. An inlet solenoid valve 8 may be used to externally shut off the gas and isolate the FCS 60'. In addition, a back-up manual valve 9 may be provided to isolate the FCS 60' from gas flow if desired.

An inlet liquid separator and filter tank 10 removes (i.e., knocks out) at least a portion of the liquid components from the incoming gas, and also filters out particulates, typically in the 1 to 10 micron size range. A coalescer filter could also be used in this device for liquid separation if desired.

At this point in the FCS 60', it is possible that the fuel pressure is below atmospheric pressure. A liquid drain arrangement consisting of two solenoid valves 11, 13 and a liquid reservoir 12 can be used to drain liquid from the sub-atmospheric separator tank 10. During a drain cycle, valve 11 would be opened to permit liquid to fill the reservoir 12. Valve 11 then closes and valve 13 opens to drain liquid out through a check valve 14 to the drain system 15. This system reduces the amount of air that is admitted into the separator tank 10 during a drain cycle. Valve 13 then closes and the cycle is repeated periodically to keep the inlet separator liquid level below a predetermined level. Other methods of draining the inlet separator tank 10 may include, but are not limited to, a pump system that removes liquids, or an eductor system. The eductor system uses a flow of high-pressure fuel, or air, at high velocities through a throat to depress the local static pressure below that of the inlet separator 10. The eductor removes liquids entrained within this flow, in much the same manner as an automobile carburetor draws in fuel. A float switch and/or a pressure switch 17 may be used to send an alarm or stop signal to the FCS control to reduce the likelihood of liquid slipping past the separator 10 in the event that the drain system fails to remove sufficient moisture from the separator tank 10.

Gaseous fuel exits the inlet filter/separator 10 and passes through a check valve 18 which ensures that gas, which could potentially be at a higher pressure than the source gas, does not flow backward into the fuel supply lines. The fuel then feeds into an inlet valve 19 that controls the flow rate to a compressor such as an oil-flooded screw-type compressor 20. The compressor 20 boosts the fuel pressure to a predetermined level suitable for engine operation. The screw compressor 20 is driven by an electric motor 21 through a gearset/adapter/coupling arrangement. The electric motor 21 is driven by a variable frequency drive (VFD) 22, sometimes also referred to as a variable speed drive. The VFD 22 varies the motor speed in response to a measured parameter, such as a fuel pressure, to maintain the parameter (fuel delivery pressure) within a desired range. Fuel temperature sensors and/or switches measure and ensure proper gas conditions from the compressor 20. In other constructions, other parameters such as a turbine or engine temperature, an engine pressure, or engine power output, are used to control the motor speed. One of ordinary skill will realize that many parameters are available that can be used to control the motor speed.

Rather than using an oil-flooded screw compressor 20, the FCS 60' could use other types of gas compressors, including positive displacement rotary and piston-type compressors, scroll compressors, or other devices. The oil-flooded screw-type compressor 20 uses mechanical seals to prevent fuel leakage from the compressor case. In another construction, a semi-hermetically sealed motor and air end (screw compressor) such as that described in U.S. patent application Ser. No. 10/627,212 herein fully incorporated by reference could also be used. Similarly, a magnetic coupling could be used with a semi-hermetically sealed air end compressor to compress the gaseous fuel/oil mixture.

Following compression, a compressed fuel/oil mixture flows through tubing/piping to a gaseous fuel/oil separator tank 23. The separator tank 23 uses a coalescer filter or other known means to separate the compressed gas from the oil. Following separation, the oil circulates through a liquid oil line to a temperature regulator valve 24. The valve 24 diverts oil through an air/oil heat exchanger 25 in response to the measured oil temperature to maintain the temperature of the oil returning to the screw compressor 20 within a desired temperature range. The temperature range should be high enough to inhibit the condensation of water in the oil and low enough to inhibit degradation of the oil. Thus, the valve 24 functions to maintain the oil temperature above a predetermined temperature and below a second predetermined temperature. This air/oil heat exchanger 25 has a fan-driven cooling system. In addition to the separator tank 23, an oil filter 26 may be used to aid in the removal of particulates from the flow of oil.

If oil permeates the coalescer filter, a scavenge line may be used to direct the oil back to the screw compressor 20 through a check valve/filter/orifice 27. A pressure relief valve 28 and a drain valve 29 may also be provided on the separator tank 23 to protect against overpressure and to allow for periodic maintenance and oil replacement. A pressure switch 30 could also be used to determine and monitor the extent of coalescer filter fouling.

Compressed fuel leaves the separator tank 23 and is regulated using a minimum pressure check valve 31. The minimum pressure check valve 31 permits the fuel pressure to build up to a certain level before proceeding through the rest of the FCS 60'. Thus, only gas above a predetermined pressure passes through the check valve 31. Alternative constructions may use a backpressure regulator or other device rather than a minimum pressure check valve 31.

Under certain operating conditions, the desired fuel flow rate as required by the engine (e.g., microturbine) is less than the fuel flow rate delivered by the compressor 20, while operating at the motor's minimum speed. A fuel bypass control system may be employed to further reduce the fuel flow rate. The fuel bypass control system uses bypass fuel to control and reduce the fuel flow rate. To reduce the fuel flow rate, the bypass line with solenoid valves 34 and 37 are opened, while valve 36, 38, and 41 are closed. The modulating valve 35 partially or fully opens the inlet valve 19 using recirculated fuel pressure. The inlet valve then "throttles" the inlet fuel flow going to the inlet side of the gas compressor 20. By effectively reducing the inlet pressure to the compressor 20, the amount of flow pumped to the rest of the FCS 60' is reduced.

If further gaseous fuel flow reductions are necessary, a fuel bypass line can be employed. To open the bypass line, solenoid valves 37 and 34 are closed, and valve 36 is opened. This configuration closes the inlet valve, but allows compressed gas to recirculate back through a solenoid valve 38, to the inlet of the inlet valve 19. A check valve 40 prevents backflow of fuel from the inlet valve into the recirculation line. A pressure drop device 39 is used to reduce the pressure to the level of the screw compressor inlet. The pressure drop device 39 can be an orifice, a manually adjustable needle valve, a regulator, or an automated valve. The solenoid valve 38 ensures no fuel is recirculated when not required.

Compression of the fuel by the compressor 20 adds heat, thereby raising the fuel temperature above the level at which it entered the FCS. A fan-cooled aftercooler 32 or heat exchanger may be used to cool the compressed fuel before the fuel enters a liquid separator device 33. A variable frequency drive (VFD) 42 (shown in FIG. 5) could be used to drive a fan 58 to more accurately control the temperature of the fuel leaving the aftercooler 32. The cooling may cause some undesirable compounds to condense out of the flow of fuel. These undesirable compounds drain from the liquid separator device 33, thus further conditioning the fuel.

Once any condensate is drained from the liquid separator device 33, the fuel is fed to a first cooling stage including a gas-to-gas heat exchanger 44 for cooling. The fuel is chilled to a suitable temperature (e.g., 55-65 degrees F.) in the first cooling stage. During this chilling process, more undesirable compounds (including water and heavy hydrocarbons) condense out of the fuel and are drained from the heat exchanger via a drain line 45. The chilled fuel leaves the first heat exchanger and flows to a coalescing separator 46 where additional undesirable compounds may be separated and drained.

Following the first cooling stage, the compressed fuel flows to one of two similar second-stage refrigerant-to-gas heat exchangers 47, 48. Each refrigerant-to-gas heat exchanger 47, 48 has sufficient capacity to cool the flow of compressed fuel to a desired temperature. Thus, at any given time (during non-transient steady-state operation), the flow of compressed fuel is directed to one of the two refrigerant-to-gas heat exchangers 47, 48. With no flow in the other of the two heat exchangers 47, 48, a defrost cycle, or other maintenance can be performed on the idle heat exchanger 47, 48 without interrupting the flow of fuel. Solenoid valves 53, 54 are used to control which of the second-stage heat exchangers 47, 48 is used to cool the gas. This cycling of the second stage heat exchanger reduces the likelihood of tubes freezing and improves the heat exchanger efficiency by periodically removing any frost build-up. As one of ordinary skill will realize, more than two heat exchangers could be employed and more than one heat exchanger could receive the flow at any given time. For example, in one construction, three heat exchangers are employed with two being active at any given time.

The refrigerant system typically uses R22, freon, R-134a, or another suitable refrigerant to chill and defrost the second-stage heat exchangers. In another construction, the refrigeration (vapor-compression) cycle is replaced by an ammonia absorption chiller system. The ammonia absorption chiller system uses the hot engine exhaust gas to drive the system rather than an electrically operated compressor as is used in the refrigeration cycle. High-pressure ammonia is expanded to provide cooling for the flow of fuel, thus achieving the desired level of cooling (approximately −20 degrees F.) as described with regard to the construction of FIG. 3.

The fuel makes at least one pass through the active second-stage heat exchanger 47, 48 and is cooled to a temperature below the freezing point of water. Each circuit in the heat exchanger has a liquid drain 49, 50 to remove liquids (undesirable compounds) that may condense. An additional liquid coalescer separator 51, 52 may also be employed to remove additional liquid materials.

The deep chilling of the fuel (nominally −20 F.) not only removes water and heavier hydrocarbons, but also removes siloxanes, halogenated compounds, and other contaminants from the fuel system. The deep chilling also removes some hydrogen sulfide (contaminant). The final chilled fuel leaving the second stage heat exchanger 47, 48 has a saturation temperature (liquid hydrocarbons, water) approximately equal to the exhaust temperature (nominally −20 F.).

The chilled, saturated fuel leaving the second stage heat exchanger 47, 48 re-enters the first gas-to-gas heat exchanger 44 where it is used to chill the incoming fuel. This also serves to heat the chilled fuel from the very cold condition (−20 F.) to a higher temperature. This produces a flow of fuel with a −20 F. dewpoint and 50-100 F. of superheat (dewpoint suppression) at location 55. Of course, more or less superheat can be achieved by varying the operating parameters or ambient conditions. The fuel exiting the gas-to-gas heat exchanger is then supplied to one or more carbon-absorber tanks 56 (arranged in parallel and/or series) to remove additional undesirable compounds (e.g., $H_2S$, HCl) that may not have been removed in the deep-chilling process.

A manual valve 57 is supplied to purge the carbon-absorber tank(s) for servicing. The deep-chilling process removes significant quantities of undesirable compounds, thereby reducing the service and maintenance requirements of the carbon media used in the absorber tank 56. A final filter 59 may be used to capture any carbon particulates that slip through the carbon-absorber 56. It should be noted that many other filters and filter media are available other than carbon (e.g., iron sponge, regenerative silica gel, absorption-de-absorption systems, Sulfatreat, etc.). As such, the invention should not be limited to carbon-absorbers alone.

The fuel is now conditioned and ready for supply to one or more microturbines via a fuel-conditioning skid outlet 60. A purge assembly consisting of a tee 61, a manual valve 62, and a check valve 63 can be used to purge air or other gases out of the FCS 60' prior to start-up. Gaseous vent 64 can be connected to vent 43 or to other vents if desired.

In another construction, the manual valve 62 is replaced with a solenoid valve so that if the fuel heating content (energy per cubic foot of gas) drops below a predetermined value, the fuel can be diverted to a flare or other outlet until the fuel quality improves. For example, if a particular application requires at least 35% methane in the fuel to operate properly, the system could divert the fuel through the solenoid valve if the methane content dropped below 35%. In some constructions, this gas is diverted to a flare or back to the source of the fuel. In yet another construction, the solenoid valve would admit high-quality (pipeline) gas to supplement the fuel supply and allow for the continued operation of the system.

Not shown in FIG. 3 is an optional receiver tank which could be used to store compressed, conditioned fuel for periods of high demand (start-up) and to dampen out pressure fluctuations due to fuel supply and demand issues. The receiver tank would preferentially be located between the FCS outlet 60 and the microturbine(s) 10' or other engines that use the fuel. A fuel solenoid could be used to ensure that when the FCS 60' is depressurized for service or maintenance, the receiver tank remains pressurized. Alternatively, if low heat content fuel were the cause of a shutdown, the receiver tank could bleed down its fuel to a flare or other on-site system.

During low-flow operating conditions (e.g., part load operation, skid start-up, and the like) the desired compressor output may fall below a predetermined level at which control of the compressor 20 becomes difficult or unstable. To avoid this scenario, the FCS 60' includes a fuel bypass line 180 that includes a bypass valve 185 that selectively redirects a portion of the fuel, after the removal of some or all of the undesirable compounds, back to the compressor 20. In the construction of FIG. 3, fuel is diverted from the outlet of the second stage heat exchanger 47, 48 to the compressor inlet valve 19. By diverting a portion of the flow of fuel, the flow into the compressor 20 can be maintained above a predetermined value. For example, one compressor must operate at 50 percent flow capacity to be controllable. During certain operating conditions, it may be desirable to deliver only 25 percent of the compressor's capacity to the engine. In this situation, the compressor operates at 50 percent (or higher) and the fuel in excess of the 25 percent needed by the engine is diverted back to the compressor. In addition to the foregoing example, the fuel bypass line 180 allows the FCS 60' to start before the engine or engines start. All of the fuel is bypassed to the compressor 20 until the heat exchangers 47, 48 reach their desired operating temperatures. This allows the FCS 60' to deliver properly conditioned fuel to the engine immediately upon engine start. In addition to the bypass valve 185, the fuel bypass line 180 may include a check valve 190 and a pressure-reducing element 195 (e.g., orifice, needle valve, pressure-reducing regulator, and the like). In some constructions, the bypass valve 185 includes a pressure regulating valve that limits the outlet pressure from the FCS 60' and a backpressure regulator valve that maintains the inlet pressure at the compressor below a predetermined value. Thus, when the FCS exit pressure exceeds a predetermined value, the valves direct a portion of the flow from the FCS outlet back to the compressor inlet.

To purge the skid 60' of high-pressure gas, solenoid valve 8 closes, and valves 66, 38 and 41 open. The minimum pressure check valve 31 inhibits the backward flow of fuel in the system through to the vent 43. The high-pressure fuel downstream of the minimum pressure check valve 31 flows through the skid 60' to location 61. The dry, clean gas then flows back to the entrance of the inlet valve 40 through the line with valve 66. The gas then flows from the inlet valve 40, through the compressor 20, separator tank 23, out to the bypass line 38, and eventually out of the vent 43. This method of purging will preferentially first purge the higher-moisture content gas from the compression end of the FCS 60' and replace it with dry, clean gas. This purge system reduces the risk of liquid condensation within the skid 60', which if present, could induce corrosion or freezing during long periods of shutdown.

The FCS 60' is designed in a modular fashion to supply a number of different fuel flow rates and pressures. The FCS 60' provides conditioned fuel for an SCFM (standard cubic feet per minute) range of 18-4300 SCFM using a plurality of sized products with higher or lower values possible. The fuel pressures output from the FCS 60' range from about 60 psig through about 120 psig, but could be either higher or lower than this if desired. Each FCS 60' can address a range of hydrogen sulfide ($H_2S$) gas contaminate levels. While not intended to remove $H_2S$ other than what is removed during the deep-chilling process, different levels of removal (e.g., 300 ppmV max, 1000 ppmV max, 3000 ppmV max) can be achieved by varying the amount of carbon absorbent material. This will entail sizing the carbon-absorber tanks 56 of the FCS 60' to address the different levels. The carbon-absorber tank(s) 56 allow easy removal and exchange of the carbon media.

Figure 4:
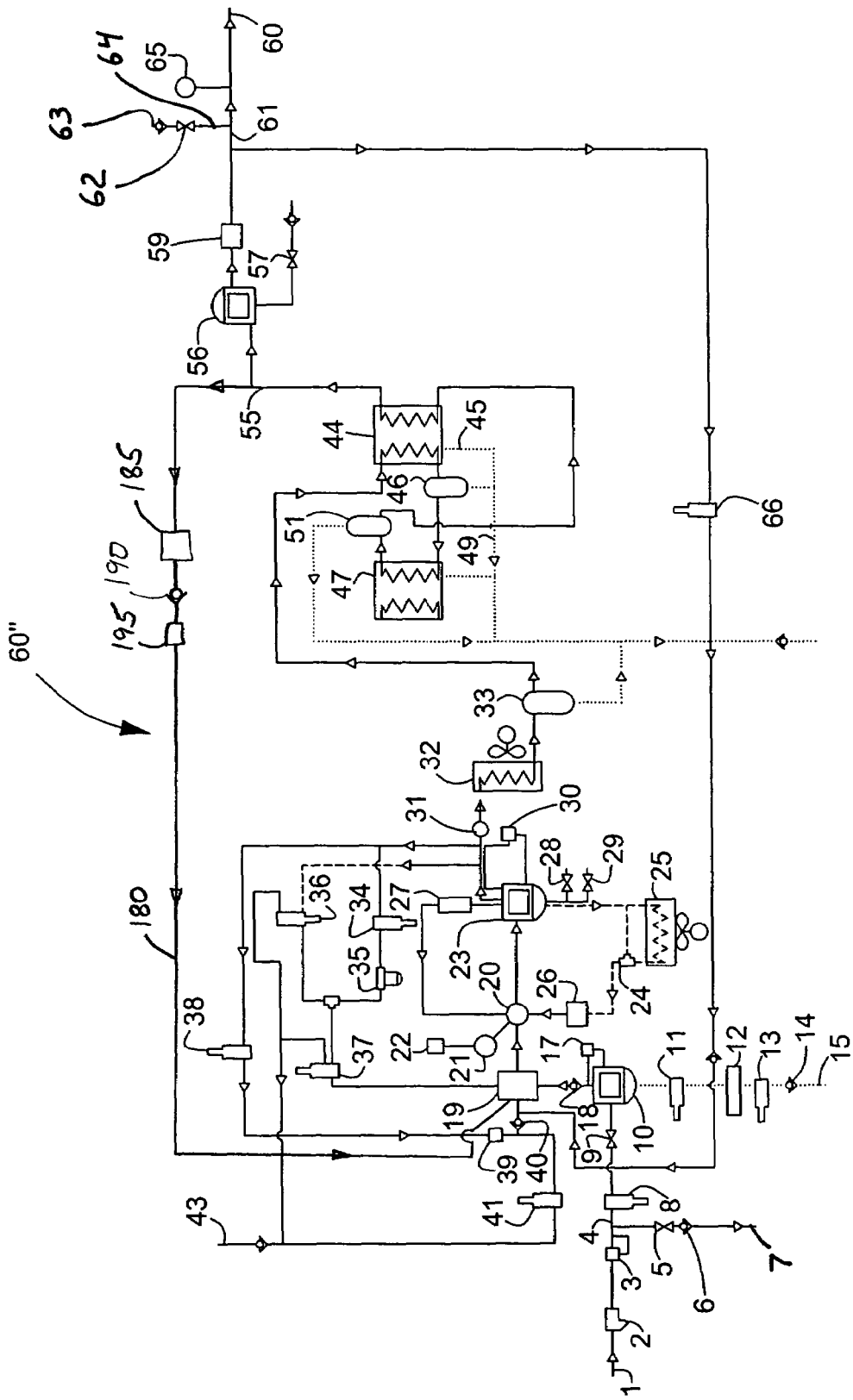
FIG. 4 is a schematic diagram of another fuel-conditioning skid without deep-chilling technology.

Another construction of the FCS 60" excludes the deep-chilling system shown in FIG. 4. With the exception of the exclusion of the deep-chilling system, the constructions of FIG. 3 and FIG. 4 are substantially similar. In the FCS 60" of FIG. 4, the minimum gas temperature remains above the freezing point of water at the coldest part of the fuel skid 60" (adjacent the condensate drain 51). Because subfreezing temperatures are avoided, only one second-stage heat exchanger 47 is needed and no defrost cycle is required. The purpose of this FCS 60" is to avoid condensing out beneficial hydrocarbons (propane, butane, and the like) at very cold temperatures. The carbon absorber tank 56 will still remove some undesirable compounds. Again, by flowing gas back through the first stage gas-to-gas heat exchanger 44, dewpoint suppression is achieved to ensure condensation in downstream fuel lines is inhibited.

Figure 5:
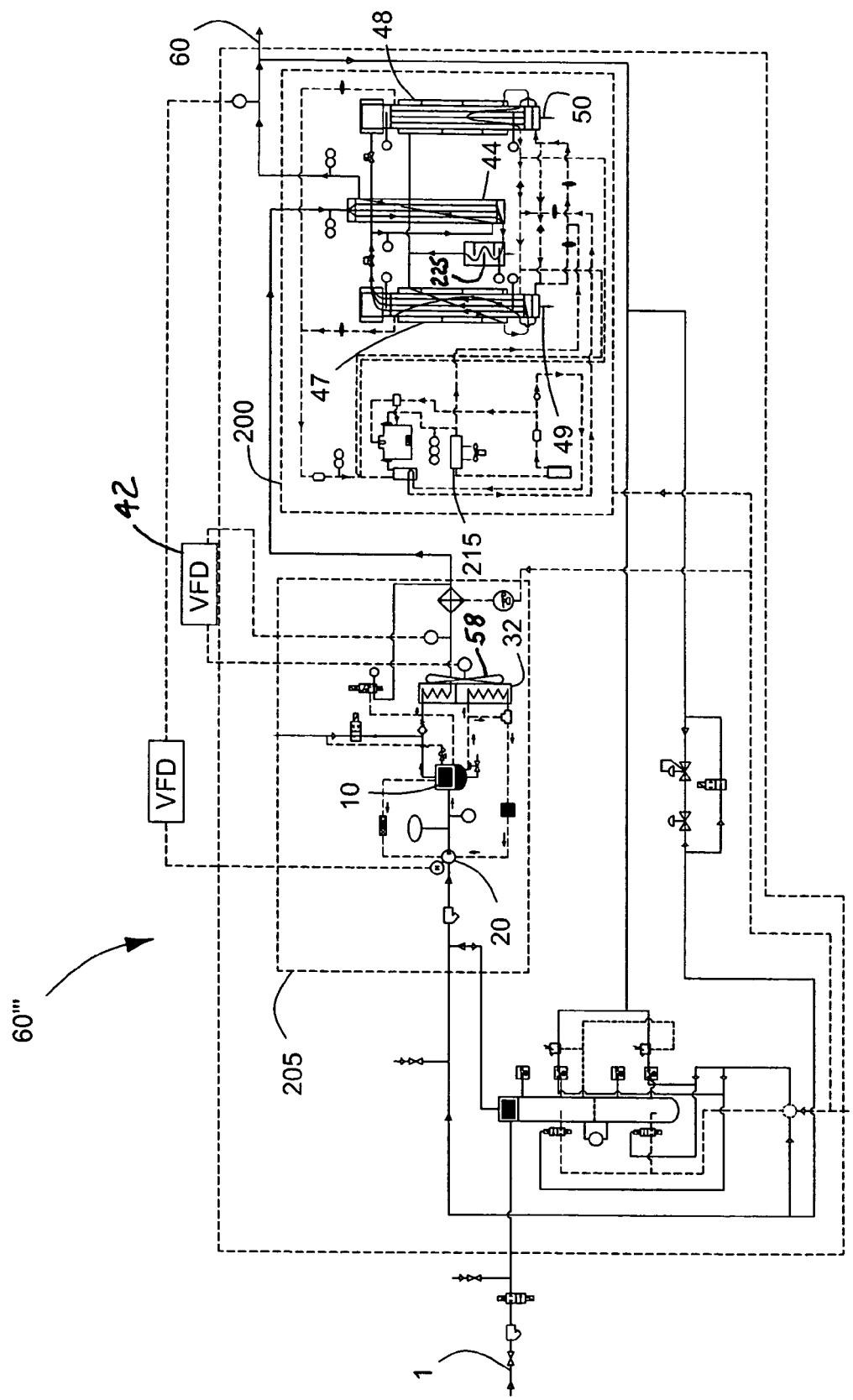
FIG. 5 is a schematic diagram of another fuel-conditioning skid with deep-chilling technology.

FIG. 5 illustrates another construction of the fuel-conditioning skid 60'''. The skid 60''' is similar to the skid 60' of FIG. 3. FIG. 5 illustrates the various system boundaries within the FCS 60'''. A chiller boundary 200 surrounds the chiller portion and in some constructions defines a housing or enclosure boundary. Similarly, a compressor module boundary 205 surrounds the compressor module and in some cases defines the location of a compressor housing or an enclosure.

Figure 6:
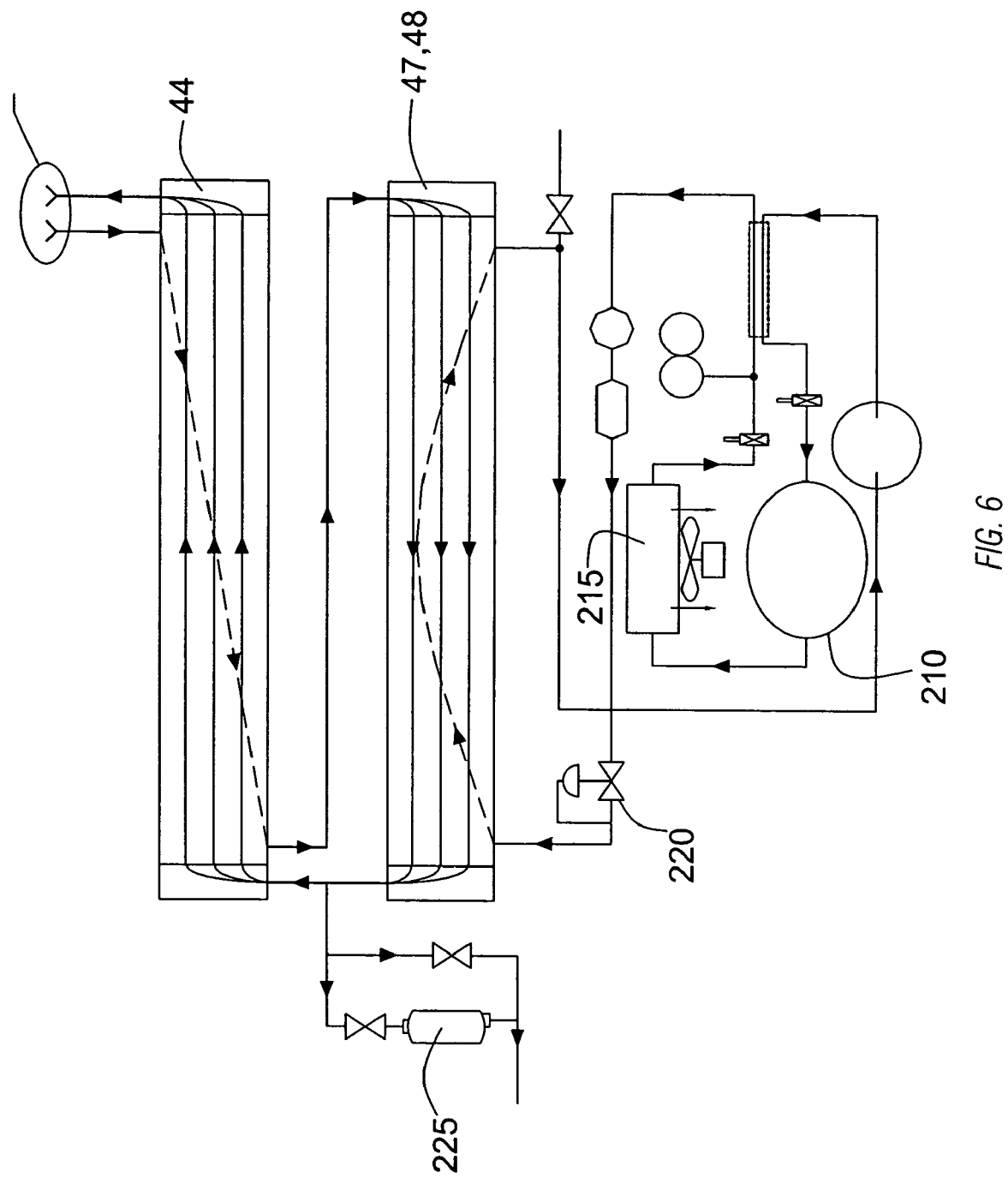
FIG. 6 is a schematic illustration of a portion of the fuel-conditioning skid of FIG. 3 including first and second stage heat exchangers.

FIG. 6 is a more detailed view of the interaction between the first stage heat exchanger 44 and the second stage heat exchanger 47, 48 and the refrigeration cycle components. The refrigeration cycle components include a compressor 210, a condenser 215, and an expansion valve 220. In addition, FIG. 6 illustrates a condensate drain system that includes a drain valve 225 at the outlet of the second stage heat exchanger 47, 48 to drain condensed undesirable compounds.

The design of the control system is such that the FCS 60', 60", 60''' can operate independent of the microturbines or other subsequent fuel users. Energy to start the FCS 60', 60", 60''' can be supplied either from the existing electrical grid or from a stored energy source such as a battery. Alternatively, a supply of high-pressure, conditioned, stored fuel, such as propane, can be supplied directly to the microturbine 10' to start the engine and subsequently supply power to start and operate the FCS 60', 60", 60'''.

A programmable logic controller (PLC) or other microprocessor-based control unit performs protective functions (alarms, trips, interlock/permissives), control functions (sequencing, logic, PID control), and information functions (operator interface, interface to other systems). Once started, the PLC controls the FCS exhaust flow rate and pressure. A pressure sensor 65 located near the outlet 60 of the FCS 60', 60", 60''' senses the FCS outlet pressure. A proportional-integral-derivative (PID) control algorithm is used to adjust the gas compressor speed by adjusting the variable frequency drive device 22. A person of ordinary skill in the art will realize that many other control systems and algorithms may be used (e.g., proportional-integral, fuzzy, etc.). The PLC also monitors gas train parameters, refrigeration cycle parameters, and the like and performs startups, shutdowns, cycles the second-stage heat exchangers, and communicates via a modem (RS232 or RS485) or other communication protocol. The FCS 60', 60", 60''' may also include fuel flow measurement sensors and/or gas monitoring equipment, such as a methane detector. The methane detector or flow rate measurement sensor could be used to determine when the source gas methane content is becoming too low for proper microturbine operation. A gas mixing system could then be used to blend pipeline natural gas, or other available gas (e.g., propane), with the biogas flow stream to improve the heat content of the fuel or simply augment the fuel flow during a start-up or during cold day operation.

The FCS 60', 60", 60''' provides enough gaseous fuel flow to start one or more microturbines 10'. During start-up, recuperated microturbines 10' and other prime movers require an increased amount of fuel flow to warm up the equipment. The design of the gas capacity of the FCS 60', 60", 60''' provides sufficient flow for this start-up. The FCS 60', 60", 60''' will also supply the higher steady-state fuel flows required during cold days. On cold days, microturbines 10' and other generators can increase the amount of energy that they produce.

The fuel-conditioning skids 60', 60", 60''' may include weatherproof enclosures for outdoor use. The FCS 60', 60", 60''' can also be used in environments where gaseous fuel could be present if a significant leak or rupture of the fuel line occurs (Class 1, Division 2 of the National Electric Code—NFPA 70). The skids operate in ambient temperatures from about −10 F. to about 115 F. and at altitudes from about sea level (0 ft) to about 6000 ft. Higher and lower temperature as well as altitude ranges can also be achieved if desired.

In applications where both a FCS 60', 60", 60''' and microturbine(s) 10' are packaged on the same skid, piping of fuel and scavenge lines between units are integrated into the apparatus to minimize installation effort after leaving the factory. A significant advantage of combining the FCS 60', 60", 60''' and microturbine(s) 10' on the same skid is that each microturbine 10' does not need its own gaseous fuel compression system. Since a source of high-pressure, clean gas is supplied to each microturbine 10' from the FCS 60', 60", 60''', a fuel control valve can be used in each microturbine 10' to modulate the supply of fuel. This leads to a more efficient energy package, by leveraging the gas compression in a single, larger, more efficient location (FCS 60', 60", 60'''). Also, the fuel control valve modulation of fuel to each microturbine 10' provides for a faster response of the microturbine 10' to a change in power requirements as compared with a system where an on-board gas compressor must change its operating condition.

The various constructions described herein are capable of removing a substantial portion of the undesirable compounds from a stream of fuel to produce a stream of fuel that is substantially free of undesirable compounds. For example, the constructions of FIG. 3 and 4 are capable of removing 90 percent of the undesirable compounds from a stream of fuel. Of course, the amount of undesirable compounds removed is a function of the quantity and type of compounds initially present. As such, systems that remove less than 90 percent and systems that remove more than 90 percent are also possible. However, to provide for proper operation of a prime mover, such as a microturbine engine, it is desirable to remove at least 98 percent of the undesirable compounds including 98 percent of the siloxanes present in the initial stream of fuel.

Although the invention has been described in detail with reference to certain preferred embodiments, variations and modifications exist within the scope and spirit of the invention as described and defined in the following claims.

What is claimed is:

1. A fuel-conditioning skid for an engine, the fuel-conditioning skid comprising:
    an inlet connectable to a source to receive a flow of gaseous fuel containing undesirable compounds;
    an outlet connectable to the engine to deliver a flow of fuel that is substantially free of undesirable compounds;
    an inlet cleaner in fluid communication with the inlet and operable to remove a portion of the undesirable compounds;
    a compressor in fluid communication with the inlet cleaner, the compressor receiving the flow of fuel at a first pressure and discharging the flow of fuel at a second pressure, the second pressure being greater than the first pressure; and
    a purifier in fluid communication with the inlet cleaner to receive the flow of fuel, the purifier operable to chill out the flow of fuel to a temperature below the freezing point of water to condense out and remove at least a portion of the remaining undesirable compounds from the flow of fuel.

2. The fuel-conditioning skid of claim 1, wherein the inlet cleaner includes an inlet filter and a liquid separator.

3. The fuel-conditioning skid of claim 1, wherein the compressor includes a variable speed drive.

4. The fuel-conditioning skid of claim 1, wherein a flow of oil passes through the compressor and the compressor includes a fuel/oil separator.

5. The fuel-conditioning skid of claim 4, wherein the compressor includes a temperature-controlled valve that selectively diverts a portion of the oil to an oil cooler to maintain the oil temperature above a predetermined level.

6. The fuel-conditioning skid of claim 1, wherein the purifier includes a multi-stage chiller for chilling the flow of fuel to a temperature below the freezing point of water, each stage of the chiller operable to cool the flow of fuel below the temperature of the previous stage, each stage including a condensate drain positioned to drain a portion of the undesirable compounds from the flow of fuel.

7. The fuel-conditioning skid of claim 6, wherein the multi-stage chiller includes:
    an aftercooler receiving the flow of fuel from the compressor, the aftercooler operable to cool the flow of fuel;
    a first stage heat exchanger receiving the flow of fuel from the aftercooler and further cooling the flow; and
    a second stage heat exchanger receiving the flow of fuel from the first stage heat exchanger and further cooling the flow.

8. The fuel-conditioning skid of claim 7, wherein the purifier includes a carbon absorber tank that receives the flow of fuel from the second stage heat exchanger and a final filter that receives the flow of fuel from the carbon absorber tank and delivers the flow of fuel to the outlet.

9. The fuel-conditioning skid of claim 7, wherein the first stage heat exchanger includes a gas-to-gas heat exchanger, and wherein the flow of fuel exiting the second stage heat exchanger cools the flow of fuel within the first stage heat exchanger.

10. The fuel-conditioning skid of claim 7, wherein the second stage heat exchanger includes a plurality of refrigerant-to-gas heat exchangers, each heat exchanger individually selectable such that only one heat exchanger receives the flow of fuel from the first stage heat exchanger during steady-state operation.

11. The fuel-conditioning skid of claim 1, further comprising a bypass flow loop that selectively diverts a portion of the fuel from the purifier to the compressor to maintain the flow through the compressor above a predetermined level.

12. The fuel-conditioning skid of claim 1, further comprising a purge system operable to remove fuel and undesirable compounds from the compressor.

13. A fuel-conditioning skid for an engine, the fuel-conditioning skid comprising:
   an inlet connectable to a source to receive a flow of gaseous fuel containing undesirable compounds;
   an outlet connectable to the engine to deliver a flow of fuel that is substantially free of undesirable compounds;
   an inlet cleaner in fluid communication with the inlet and operable to remove a portion of the undesirable compounds;
   a compressor in fluid communication with the inlet cleaner, the compressor receiving the flow of fuel at a first pressure and discharging the flow of fuel at a second pressure, the second pressure being greater than the first pressure and at least 15 psig;
   a purifier in fluid communication with the inlet cleaner to receive the flow of fuel, the purifier operable to chill the flow of fuel to condense out and remove at least a portion of the remaining undesirable compounds from the flow of fuel; and
   a heat exchanger to warm the flow of chilled fuel.

* * * * *